E. RENDANO.
FASTENING DEVICE.
APPLICATION FILED MAY 8, 1919.
1,328,201. Patented Jan. 13, 1920.
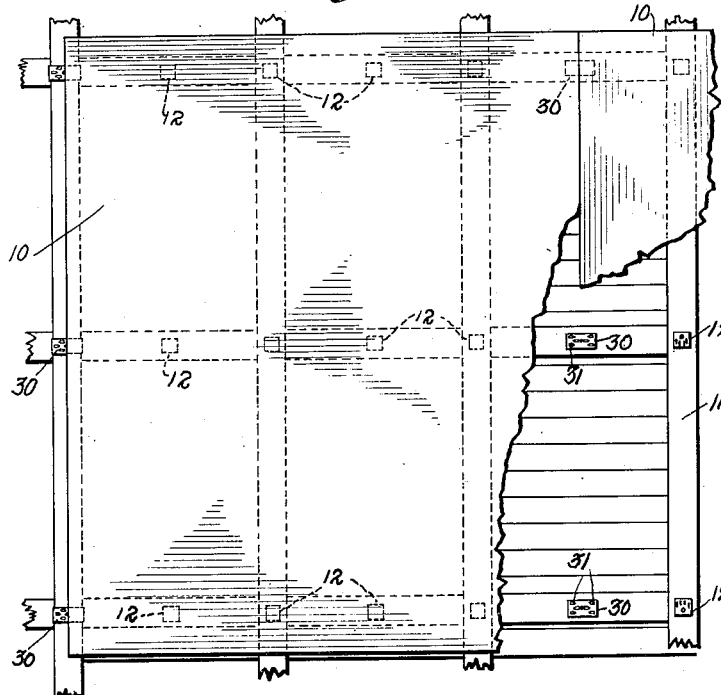
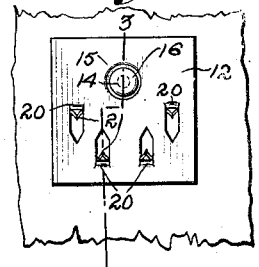
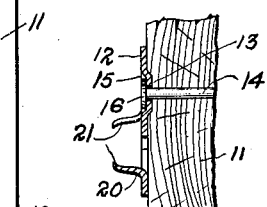
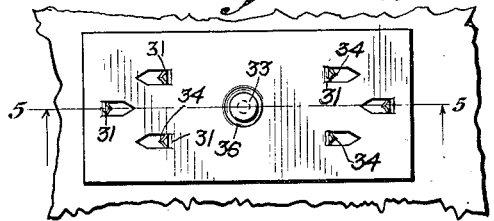
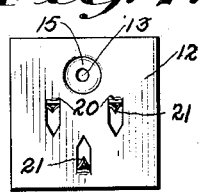
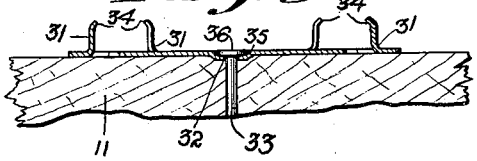
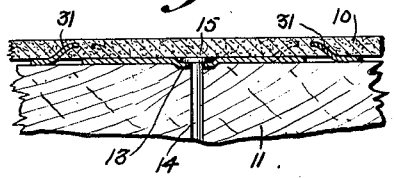
WITNESSES
INVENTOR
EMIL RENDANO
BY
ATTORNEYS

UNITED STATES PATENT OFFICE.

EMIL RENDANO, OF BROOKLYN, NEW YORK, ASSIGNOR OF ONE-HALF TO EMIL RENDANO AND NICHOLAS RENDANO, BOTH OF NEW YORK, N. Y., AND ONE-HALF TO PHILIP J. FORBES, OF BROOKLYN, NEW YORK.

FASTENING DEVICE.

1,328,201.  Specification of Letters Patent.  Patented Jan. 13, 1920.

Application filed May 8, 1919. Serial No. 295,629.

*To all whom it may concern:*

Be it known that I, EMIL RENDANO, a citizen of the United States, and a resident of the city of New York, borough of Brooklyn, in the county of Kings and State of New York, have invented a new and Improved Fastening Device, of which the following is a full, clear, and exact description.

The object of the invention is to provide a new and improved fastening device more especially designed for quickly and securely fastening plaster boards or wall boards to studding or other supports in buildings. Another object is to insure a proper joining of adjacent wall boards.

With these and other objects in view, the invention consists of certain novel features of construction, as hereinafter shown and described and then specifically pointed out in the claim.

A practical embodiment of the invention is represented in the accompanying drawings forming a part of this specification, in which similar characters of reference indicate corresponding parts in all the views.

Figure 1 is a face view of the improved fastening device in use for fastening wall boards to a studding, portions of the wall boards being shown broken out;

Fig. 2 is an enlarged face view of the improved fastening device;

Fig. 3 is a cross section of the same on the line 3—3 of Fig. 2;

Fig. 4 is a face view of one of the joint fastening devices in position on a support;

Fig. 5 is a sectional plan view of the same on the line 5—5 of Fig. 4;

Fig. 6 is a similar view of the same with the wall board fastened in position by the fastening device shown in Figs. 4 and 5; and Fig. 7 is a face view of a modified form of the fastening device.

In order to fasten the wall boards 10 to studding 11 or other suitable support, use is made of a number of fastening devices each in the form of a plate 12 provided with a nail hole 13 for the passage of a nail 14 driven into the studding or other support 11 to fasten the plate 12 in position on such support, as plainly shown in the drawings. The plate 12 has a portion surrounding the wall of the nail hole 13 indented to form a recess 15 for the reception of the head 16 of the nail 14 whereby the face of the nail is flush with the face of the plate and hence the nail head does not form an undesirable projection on the face of the plate 12 to allow snug fitting of the back of a wall board 10 against the face of each plate 12. Each plate 12 is provided with struck-up prongs 20 each projecting approximately at a right angle from the face of the plate 12, and each prong 20 terminates in an angular point 21. By reference to Fig. 2 it will be noticed that the prongs 20 are arranged in staggered relation and adjacent prongs have their points 21 projecting toward each other. When the wall board 10 is pressed against the several plates 12 or hammered in position then the prongs 20 pass into the material of the wall board and owing to the angular points 21 the prongs are bent toward each other into clenching position, as plainly shown in Fig. 6. The height of the prongs, relative to the thickness of the wall boards, is such that the points of the prongs do not pass through the outer face of the wall board but the entire prong is concealed or embedded within the material of the wall board. Thus by the arrangement described, the prongs readily pass into the comparatively soft material of the wall boards and are bent into a clenching position when the points penetrate to the face of the wall board thus presenting no undesirable projections on the face of the wall board.

The fastening plate 30, shown in Figs. 4, 5 and 6, is provided with two sets of prongs 31 disposed on opposite sides of a centrally arranged nail hole 32 to permit of engaging the two adjacent wall boards 10 at the joint thereof. It is understood that the plate 30 is fastened by a nail 33 to the support 11 and the two sets of prongs are driven into the adjacent wall boards and clenched and embedded therein, the same as above described in reference to the single fastening device. It is understood that the prongs 31 are provided with angular points 34 and the action of the prongs 31 is the same as that of the prongs 20. The portion surrounding the nail hole 32 is indented to form a recess 35 for the reception of the head 36 of the nail 33.

It will be noticed that by arranging the prongs in staggered relation, they form a claw when clenched in the wall board material and hence the wall board is securely fastened in place on the support. In practice, the fasteners are disposed on the support to engage the middle and the top and bottom margins of a wall board and the fasteners are spaced about eight inches apart. Joint or double fasteners are used along adjacent wall boards to insure the formation of close joints.

Having thus described my invention, I claim as new and desire to secure by Letters Patent:—

As an article of manufacture, a fastening device for fastening wall boards to a support, comprising a plate provided with oppositely disposed struck-up clenching prongs extending approximately at a right angle from the face of the plate and having angular points bent slightly toward each other, said oppositely disposed prongs being in non-alinement lengthwise of said prongs and so positioned that their points overlap when the prongs are in the plane of said plate.

EMIL RENDANO.